United States Patent Office 3,346,541
Patented Oct. 10, 1967

3,346,541
PROCESS FOR MANUFACTURING LINEAR FIBER AND FILM FORMING POLYESTERS BY POLYCONDENSATION IN THE PRESENCE OF A TITANIUM ALKOXIDE CATALYST AND A GERMANIUM COMPOUND
Trevor Davies, Norman Fletcher, and James Eric McIntyre, Harrogate, England, assignors to Imperial Chemical Industries Limited, London, England, a corporation of Great Britain
No Drawing. Filed Mar. 10, 1966, Ser. No. 533,266
Claims priority, application Great Britain, Mar. 9, 1961, 8,671/61
7 Claims. (Cl. 260—75)

This application is a continuation in part of our copending application, Ser. No. 177,214 filed Mar. 5, 1962.

This invention relates to a catalyst system for use in the manufacture of linear fibre and film-forming polyesters, more particularly to a system in which the synergistic catalytic effect of germanium in the presence of titanium is used.

In the manufacture of linear fibre and film-forming polyesters such as the highly polymeric polymethylene terephthalates, for example polyethylene terephthalate and copolyethylene terephthalates with minor amounts of a second component, such as polyethylene isophthalate or polyethylene sebacate and the polyester derived from terephthalic acid and 1:4-cyclohexanedimethanol, many catalysts have been disclosed both for the initial ester-interchange and the later polycondensation stages which take place in the manufacture of these polyesters on the commercial scale.

Among the many catalysts that have been disclosed there are included the separate use of germanium, antimony and titanium and compounds of these three metals. For example United States specification 2,578,660 discloses the use of germanium and germanium dioxide and in the specification of our United States Patent No. 3,074,913 we describe the use of a compound of germanium which is readily soluble in, or which readily forms a solution in glycol which is miscible with, the polycondensation reaction mixture.

Among the many disclosures of the use of titanium compounds as catalysts in the manufacture of fibre-forming polyesters we would refer to British patent specifications 775,316, 777,216, 793,111, 851,061 and United States specifications 2,727,881 and 2,822,348. In many cases these titanium compounds may be used both for the ester-interchange and polycondensation stages.

Whilst it has been found that the germanium compounds alone produce polyesters of excellent colour or whiteness, they do not provide for a very rapid rate of polycondensation. On the other hand titanium compounds although bringing about very rapid rate of reaction at the polycondensation stage and reducing the overall cycle time, lead to the formation of polyesters possessing a distinctly yellow colour (in this connection we would refer to the Examples 9–14 of British specification 851,061).

An object of the present invention is the provision of a catalyst system for the preparation of a polyester which whilst facilitating rapid reaction at the polycondensation stage, results in a polyester of good colour, in particular being relatively free from yellowness.

According to the present invention we provide a process for the manufacture of linear fibre and film-forming polyesters obtained by reacting a diol with terephthalic acid or an ester-forming derivative thereof and polycondensing the resultant diol terephthalate, characterised in that a titanium compound together with a germanium compound is present, at least during the polycondensation step.

We prefer that the titanium and germanium compounds are soluble in the reaction mixture and our preferred compounds of these two metals are their alkoxides, such as titanium tetraisopropoxide, titanium tetrabutoxide and germanium tetraethoxide. If the polyester is prepared from an ester of terephthalic acid, the ester-interchange reaction with the diol may if desired take place in the presence of an additional catalytic ester-interchange catalyst. Any of the prior disclosed ester-interchange catalysts used in the manufacture of fibre and film-forming linear polyesters derived from terephthalic acid may be used in the process of the present invention, our preferred ester-interchange catalysts being compounds of calcium, particularly its acetate. It is often desirable to inactivate the ester-interchange catalytic metal before polycondensation commences and a common method of doing this is by the addition of a suitable amount of a phosphorus compound, for example triphenyl phosphite or phosphorous acid.

In the manufacture of polyethylene terephthalate throughout the world on a commercial scale, the polycondensation catalyst used is a compound of antimony. It is therefore very surprising to find that the synergistic effect which is shown by the combination of germanium and titanium compounds is not also shown by a combination of antimony and titanium.

| Example | Phosphorous Compound | | Titanium Compound | | Germanium Compound | | Polycondensation time (min.) | Quality of Polyester | | | | | |
|---|---|---|---|---|---|---|---|---|---|---|---|---|---|
| | Type | Quantity, percent | Type | Quantity, percent | Type | Quantity, percent | | S.Pt. | I.V. | L | Y | L-Y | S.O.D. |
| 1 | T.P.P. | 0.111 | | | GeO$_2$ | 0.07 | 70 | 255.8 | 0.757 | 81 | 7 | 74 | |
| 2 | T.P.P. | 0.111 | Ti(OC$_4$H$_9$)$_4$ | 0.04 | GeO$_2$ | 0.07 | 45 | 254.8 | 0.734 | 75 | 12 | 63 | |
| 3 | T.P.P. | 0.111 | Ti(OC$_4$H$_9$)$_4$ | 0.04 | | | 45 | 259.5 | 0.780 | 67 | 54 | 13 | |
| 4 | T.P.P. | 0.111 | | | GeCl$_4$ | 0.015 | 170 | 262.2 | 0.602 | 73 | 14 | 59 | |
| 5 | T.P.P. | 0.111 | Ti(OC$_4$H$_9$)$_4$ | 0.02 | GeCl$_4$ | 0.015 | 50 | 261.1 | 0.717 | 77 | 27 | 50 | |
| 6 | T.P.P. | 0.111 | Ti(OC$_4$H$_9$)$_4$ | 0.02 | | | 50 | 260.8 | 0.653 | 71 | 47 | 24 | |
| 7 | T.P.P. | 0.111 | Ti(OC$_3$H$_7$)$_4$ | 0.02 | Nil | Nil | 130 | | 0.650 | | | | 0.312 |
| 8 | T.P.P. | 0.111 | Ti(OC$_3$H$_7$)$_4$ | 0.02 | Ge(OC$_2$H$_5$)$_4$ | 0.035 | 141 | | 0.622 | | | | 0.055 |
| 9 | H$_3$PO$_3$ | 0.035 | Ti(OC$_4$H$_9$)$_4$ | 0.02 | Nil | Nil | 58 | | 0.673 | 74 | 38 | 36 | |
| 10 | T.P.P. | 0.111 | Ti(OC$_4$H$_9$)$_4$ | 0.02 | Ge(OC$_2$H$_5$)$_4$ | 0.035 | 71 | | 0.686 | 74 | 16 | 58 | |
| 11 | T.P.P. | 0.136 | Nil | Nil | Ge(OC$_2$H$_5$)$_4$ | 0.035 | 140 | | 0.734 | 77 | 7 | 70 | |
| 12 | T.P.P. | 0.111 | Ti(OC$_3$H$_7$)$_4$ | 0.02 | Nil | Nil | 47 | | 0.684 | 70 | 38 | 32 | |
| 13 | T.P.P. | 0.111 | Ti(OC$_3$H$_7$)$_4$ | 0.02 | Antimonic Acid. | 0.057 | 54 | | 0.683 | 68 | 36 | 32 | |
| 14 | T.P.P. | 0.111 | Nil | Nil | Antimonic Acid. | 0.057 | 95 | | 0.677 | 67 | 9 | 58 | |

S.Pt. is softening point.
I.V. is intrinsic viscosity measured on a 1% by weight solution in ortho chlorophenol at 25° C.
T.P.P. is triphenyl phosphite.

In all the examples the percentages are given by weight on the dimethyl terephthalate used and in each case 0.07% of calcium acetate was added as an ester-interchange catalyst. In Examples 7 and 8, 120 gms. of dimethyl terephthalate were used, while in Examples 1-6 and 9-14 1552 gms. were used and in each example this di-ester was interchanged at 160-210° C. with 2.5 mols of ethylene glycol per mol di-ester. After ester-interchange had been completed, as indicated by the absence of any further liberation of methanol, the titanium (0.02%), germanium (0.035%) or antimony (0.057%), and phosphorus compounds were added to the ester-interchange reaction product in the manner as indicated in the above table. Polycondensation was then undertaken i neach case at a temperature of 285° C. and at a pressure of less than 0.3 mm. mercury until the intrinsic viscosity (I.V.), indicated was reached.

In the case of the small-scale Examples 7 and 8, the solution optical densities (S.O.D.) were determined using a 6.5 w/w solution of polymer in dichloroacetic acid. The values quoted are optical densities using a 1 cm. cell at 400 m$\mu$, with pure dichloroacetic acid as reference substance.

In the case of Examples 1-6 and 9-14 in which there had been added during the manufacture of the polymer, 0.5% of titanium dioxide as delustrant, the luminance (1) and yellowness (Y) values of the resulting polyesters were determined using a "Colormaster" which is the trade name for the differential colorimeter.

Luminance is a measure of the proportion of the incident light reflected and yellowness is a measure, based on C.I.E. (Conference Internationale d'Eclairage) chromaticity co-ordinates, of the separation of the point representing the colour rating of the polymer from the point representing standard illuminant C, positive values being measured in the direction of a dominant wavelength of 580-590 m$\mu$ and negative values in the direction of a dominant wavelength of 470-490 m$\mu$.

Relatively small variations in the luminance and yellowness values of polyesters prepared for filament and film ultimate and uses can be of considerable importance in deciding the value of such polyesters for commercial purposes and it is thus essential, particularly for filament and uses, that such polyesters should have high degrees of luminance together with low degrees of yellowness.

We have found that when the yellowness value is not substantially less than zero and when using a germanium or antimony compound as the polycondensation catalyst, a useful criterion of colour is obtained by subtracting the yellowness value from that of the luminance. The best colour is obtained when the luminance value minus the yellowness value is at a maximum. However, for a comparison of this type to be made it is essential that the polyesters in the examples to be compared are manufactured under identical conditions for examples on the same scale and in the same equipment and using the same ester-interchange catalyst where a compound other than a titanium compound is used for this purpose.

We claim:
1. A process for the manufacture of linear fiber and film-forming polyesters which comprises reacting and polycondensing ethylene glycol with an ester-forming derivative of terephthalic acid, in the presence, at least during the polycondensation step, of about 0.02% of a titanium alkoxide, together with about 0.035% of a member of the group consisting of germanium alkoxide, germanium dioxide and germanium tetrachloride, the percentages based upon the weight of the ester-forming derivative of terephthalate acid.

2. A process according to claim 1 wherein the germanium alkoxide is present during the reaction of ethylene glycol with an ester-forming derivative of terephthalic acid.

3. A process according to claim 1 wherein the titanium alkoxide is the tetraisopropoxide.

4. A process according to claim 1 wherein the titanium alkoxide is the tetrabutoxide.

5. A process according to claim 1 wherein the germanium alkoxide is the tetraethoxide.

6. A process according to claim 1 in which an ester-interchange catalyst also is present during the reaction of ethylene glycol with an ester-forming derivative of terephthalic acid.

7. A process as set forth in claim 1 in which said germanium compound is a germanium alkoxide.

References Cited
UNITED STATES PATENTS

| | | | |
|---|---|---|---|
| 2,465,319 | 3/1949 | Whinfield | 260—75 |
| 2,578,660 | 12/1951 | Auspos | 260—75 |
| 2,720,502 | 10/1955 | Caldwell | 260—75 |
| 2,727,881 | 12/1955 | Caldwell et al. | 260—75 |
| 3,047,515 | 7/1962 | Piirma | 260—75 |
| 3,056,818 | 10/1962 | Werber | 260—75 |
| 3,074,913 | 1/1963 | Davies et al. | 260—75 |

WILLIAM H. SHORT, *Primary Examiner.*

LOUISE P. QUAST, *Examiner.*